US012517969B2

(12) United States Patent
Kanza et al.

(10) Patent No.: US 12,517,969 B2
(45) Date of Patent: *Jan. 6, 2026

(54) CONFIDENTIALITY PRESERVING INTRAORGANIZATIONAL EXPERT SEARCH

(71) Applicant: AT&T Intellectual Property I, L.P., Atlanta, GA (US)

(72) Inventors: Yaron Kanza, Fair Lawn, NJ (US); Divesh Srivastava, Summit, NJ (US); Caroline Stone, St. Louis, MO (US); David Wood, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,026

(22) Filed: Sep. 16, 2024

(65) Prior Publication Data

US 2025/0005094 A1  Jan. 2, 2025

Related U.S. Application Data

(63) Continuation of application No. 17/734,400, filed on May 2, 2022, now Pat. No. 12,093,333.

(51) Int. Cl.
*G06F 16/9538* (2019.01)
(52) U.S. Cl.
CPC ................ *G06F 16/9538* (2019.01)
(58) Field of Classification Search
CPC .................................. G06F 16/9538
See application file for complete search history.

(56) References Cited

U.S. PATENT DOCUMENTS

| 2010/0005087 A1* | 1/2010 | Basco | G06F 16/9536 707/E17.017 |
| 2011/0055207 A1* | 3/2011 | Schorzman | H04L 47/783 707/723 |

(Continued)

OTHER PUBLICATIONS

Lykke, M., et al, "Expert finder systems—design and use" Survey Results, Aalborg Universitet, 2011, 15 pages, downloaded from https://vbn.aau.dk/en/publications/expert-finder-systems-design-and-use-survey-results on Oct. 24, 2022.

(Continued)

*Primary Examiner* — Jared M Bibbee

(57) ABSTRACT

A processing system including at least one processor may obtain at least one search term and an identity of a searcher, identify individuals who are each either a one-step or two-step association of the searcher, identify first documents associated with the individuals and associated with the search term(s), calculate, for each individual, a score based upon citations of second documents to documents associated with the individual from among the first documents, generate an invitation to at least one individual to appear in a search result, and obtain a consent from the at least one individual. The processing system may then present the search result as an ordered list of at least a portion of the individuals, where the ordered list is ordered by the score for each individual, and where the at least the portion of the plurality of individuals includes the at least one individual.

20 Claims, 4 Drawing Sheets

(56) References Cited

U.S. PATENT DOCUMENTS

| | | | | |
|---|---|---|---|---|
| 2012/0310928 | A1* | 12/2012 | Ray | G06F 16/90335 707/723 |
| 2013/0054638 | A1* | 2/2013 | Kim | G06F 16/313 707/769 |
| 2014/0101197 | A1* | 4/2014 | Charytoniuk | G06F 16/9535 707/E17.014 |
| 2015/0120782 | A1* | 4/2015 | Kim | G06Q 50/01 707/798 |
| 2015/0261756 | A1* | 9/2015 | Klemm | G06F 16/24578 707/723 |
| 2017/0262451 | A1* | 9/2017 | Milner | G06F 16/285 |
| 2020/0026769 | A1* | 1/2020 | Tripodi | G06F 16/245 |
| 2020/0133967 | A1* | 4/2020 | Shukla | G06F 16/3334 |

OTHER PUBLICATIONS

ExpertiseFinder.com, "Search Engine to Find Experts from Universities", downloaded from https://expertisefinder.com/ on Oct. 24, 2022, 15 pages.

Elsevier, "Expert Lookup", Research Intelligence Solutions, downloaded from https://www.elsevier.com/solutions/expert-lookup on Oct. 28, 2022, 8 pages.

Google, "Directory of Experts Worldwide", downloaded from https://developers.google.com/community/experts/ directory on Oct. 24, 2022, 6 pages.

Experts Exchange, downloaded from https://www.experts-exchange.com/ on Oct. 28, 2022, 9 pages.

MIT.edu, "Find an Expert Research Response", downloaded from https://dr2.mit.edu/find-an-expert on Oct. 24, 2022, 5 pages.

Linked In, "Log In or Sign Up—Welcome to your professional community", downloaded from https://www.linkedin.com/ on Oct. 28, 2022, 7 pages.

IBM, "IBM Expert Labs", downloaded from https://connections-apps.com/product/ibm-expertise-locator/ on Nov. 8, 2022, 6 pages.

Lin, Shuyi, et al. "A survey on expert finding techniques." Journal of Intelligent Information Systems 49.2 (2017): 255-279.

Lappas, Theodoros, Kun Liu, and Evimaria Terzi. "A survey of algorithms and systems for expert location in social networks." Social network data analytics. Springer, Boston, MA, 2011. 215-241.

Becerra-Fernandez, Irma. "Searching for experts on the Web: A review of contemporary expertise locator systems." ACM Transactions on Internet Technology (TOIT) 6.4 (2006): 333-355.

D'Amore, Raymond. "Expertise community detection." Proceedings of the 27th annual international ACM SIGIR conference on Research and development in information retrieval. 2004.

Yimam-Seid, Dawit, and Alfred Kobsa. "Expert-finding systems for organizations: Problem and domain analysis and the DEMOIR approah." Journal of Organizational Computing and Electronic Commerce 13.1 (2003): 1-24.

Craswell, Nick, Arjen P. De Vries, and Ian Soboroff. "Overview of the TREC 2005 Enterprise Track." Text REtrieval Conference (TREC). vol. 5. 2005.

* cited by examiner

CONFIDENTIALITY PRESERVING INTRAORGANIZATIONAL EXPERT SEARCH This application is a continuation of U.S. patent application Ser. No. 17/734,400 filed on May 2, 2022, now U.S. Pat. No. 12,093,333, which is herein incorporated by reference in its entirety.

BACKGROUND

The present disclosure relates generally to expert finder systems, and more particularly to methods, computer-readable media, and apparatuses for presenting an ordered list of individuals in accordance with scores based upon a number of citations of a second plurality of documents from at least one document database to documents associated with the individuals from among a first plurality of documents from the at least one document database that are associated with at least one search term.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
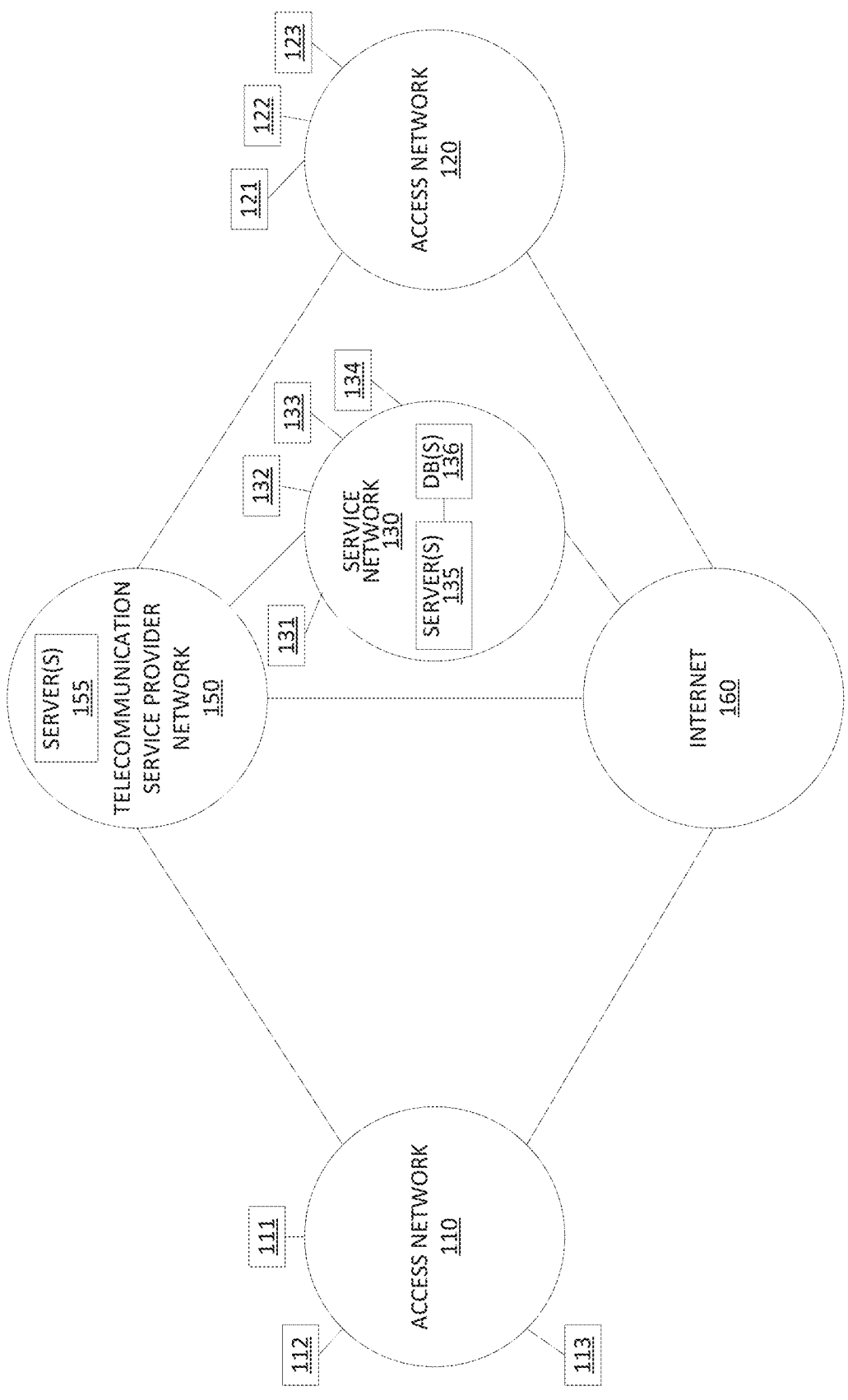
FIG. 1 illustrates one example of a system including a telecommunication network, according to the present disclosure.

The present disclosure broadly discloses methods, non-transitory (i.e., tangible or physical) computer-readable media, and apparatuses for presenting an ordered list of individuals in accordance with scores based upon a number of citations of a second plurality of documents from at least one document database to documents associated with the individuals from among a first plurality of documents from the at least one document database that are associated with at least one search term. For instance, in one example, a processing system including at least one processor may obtain at least one search term and an identity of a searcher, identify a plurality of individuals who are each either a one-step association of the searcher or a two-step association of the searcher, and identify from at least one document database a first plurality of documents associated with the plurality of individuals and also associated with the at least one search term. The processing system may next calculate, for each individual of the plurality of individuals, a score for the individual that is based upon a number of citations of a second plurality of documents from the at least one document database to documents associated with the individual from among the first plurality of documents, generate an invitation to at least one individual of the plurality of individuals to appear in a search result, and obtain a consent to appear in the search result from the at least one individual. The processing system may then present the search result comprising an ordered list of at least a portion of the plurality of individuals, where the ordered list is ordered by the score for each individual of the at least the portion of the plurality of individuals, and where the at least the portion of the plurality of individuals includes the at least one individual.

Recently there has been a rapid increase in the demand for experts in the areas of artificial intelligence, machine learning, data science, cyber-security, blockchain, natural language processing, distributed systems, cloud computing, and so forth. With the rising demand for experts in these and other fields, the search for experts is becoming a challenge for large organizations, which struggle to use such experts in an effective way. Examples of the present disclosure describe an expert finder system that allows members of an organization to find experts in a way that is fast, effective, and privacy-aware. In expert finding systems, the goal is to find an expert—a specialist with wide knowledge in a specified area or with particular technological abilities. Experts can have different roles in an organization. They can advise on new technologies and systems, review written material, and assist in solving problems that require specialization or unique knowledge. Experts often have a critical role in the development of new products or services, and frequently, their expert advices constitute essential inputs for making impactful strategic decisions for the organization. However, in a large organization, a searcher may only know a small percentage of other employees in the organization, often rendering expert-finding difficult and time consuming.

To illustrate, an expert search may be conducted iteratively through a series of email exchanges. For instance, a searcher may send emails to members of the organization, with a description of the required expertise. Some replies may contain names and emails for further search. The returned names may be grouped by the searcher, and the searcher may send emails to the new group of people. Then, replies with additional names may be gathered and used in the next iteration. This may continue until a suitable expert is discovered, the list of names is exhausted, or the searcher gets tired of sending emails. This is a wasteful and ineffective process with several disadvantages. First, it is a time consuming and slow process to send emails, to wait for replies, to make sure that emails are not sent to people more than once, and to repeat iteratively. This consumes time not just for the searcher but also for receivers of emails who need to formulate replies and introduce other individuals to the searcher. Second, it is not guaranteed that the searcher will locate or discover relevant experts, even if the relevant experts exist in the organization. For instance, the result may depend on the initial group of people to whom emails are sent. Third, such a process may reveal sensitive information about the organization. For instance, there is no central control regarding what is revealed in the email exchanges and the process of introducing people to one another.

Examples of the present disclosure describe an expert finder system that leverages the social network of an organization, while protecting the privacy of members of the organization (e.g., searchers and potential experts) and without exposing secrets or sensitive data of searchers, experts, and the organization. In particular, the present disclosure aims to provide a favorable balance between transparency regarding the availability of experts in the company and a desire to keep private and sensitive information concealed.

In one example, the present disclosure may enable a search to be conducted over a variety of data sources, e.g., based on the user selection and access permissions of the searcher. For example, the present disclosure may integrate the information from pertinent datasets. In addition, search results may conform to organization policies relating to privacy, business confidentiality, and discretion. In one example, the inferred social network of the company may be used, in a privacy-preserving manner, to recommend for each expert that is found in a search, an intermediary person who knows both the searcher and the expert. The intermediary person may be automatically requested to introduce the searcher to the potential expert, to increase the effectiveness of the initial interaction and the chances of establishing a collaboration. Advanced machine learning (ML) and natural language processing (NLP) tools may also be used for enhancing and refining the search.

An expert search executed in accordance with the above features provides an effective way to reach out to experts without breaching the privacy of the searcher or of the potential experts, and without revealing confidential business information to unauthorized individuals. As an example of a privacy breach, a manager may search for an expert in a particular area while some of the manager's current direct reports may see themselves as experts. These employees could be offended by learning about the manager's search. Another example of a privacy breach is when experts discover that their names appeared in a search result while knowing that the searcher never approached them. In still another example, a third party, such as another employee of the organization, may see that someone conducted a search but only approached an arbitrary subset of the experts in the search result and only received a positive answer of willingness to help from some of the approached experts. Accordingly, in one example, searches and interactions that follow a search are regarded as confidential information and may only be revealed in a way that does not lead to a privacy breach.

In accordance with the present disclosure, to conduct a search for an expert, a user (or "searcher") may provide search terms, e.g., keywords or expressions that describe the subject matter for which expertise is sought. The searcher may combine one or more search terms via conjunction ("and") or disjunction ("or") of terms. In one example, the search may be conducted over documents that are associated with members of an organization (e.g., employees of a corporation, university staff, etc.). The present disclosure may conduct the search over a variety of data sources in a modular way that allows adding new data sources. For instance, in one example, a data source may comprise an organization-internal document database, e.g., a repository of scientific and other technical papers written by employees, members, or other individuals associated with the organization. Another document database may be an organization-internal question-and-answer (Q&A) system that contains answers to technical questions, an organization-internal database of transcripts and other materials of technical talks, patents and/or patent applications associated with employees, members, or other individuals associated with the organization, etc. In one example, the types of documents used in the search may be reviewed or approved in a way that provides an external attestation to the expertise of the involved authors, contributors, and/or inventors. In one example, the searcher can select the data sources that will be utilized in the search.

Notably, many organizations have access to a large repository of technical documents that may be used for the search, e.g., a collection of patents or a repository of scientific articles. In such repositories, documents contain references to other documents. Using such repositories for finding experts has several advantages. First, the documents represent a variety of areas and are not restricted to a small number of predefined categories. Second, the documents are reviewed by experts in the field, which provides an external attestation, unlike self-reports where individuals declare themselves as experts but may not have properly or objectively assessed their own abilities. Third, the citations of documents by other documents may also provide evidence to the influence of the documents and testify to the overall impact of the authors (and similarly for editors, inventors/patent applicants, etc.). For example, a scientific paper that is highly cited often has a higher influence than a paper that has not been highly cited.

An expert search system according to the present disclosure may include several components. For instance, in one example, a search system may comprise a client-server application, where the client may comprise a web page that receives search queries and presents the search results. A search query may be sent to a web server that processes the query over a search index. A local repository may contain information about the employees, members, or other individuals associated with an organization. Accordingly, the results may present contact information such as email addresses, phone number(s), organization info (e.g., department, assigned office location, etc.), links to web-phone pages, etc. In one example, the local repository may also store information about individuals formerly employed or otherwise formerly associated with the organization (e.g., "legacy" individuals). In one example, the searcher may choose whether or not to include these legacy individuals in the search and/or in the search results.

To create the search index, data items may be extracted from various sources, transformed into a format that is suitable for ingestion, and indexed in the search index. To illustrate, in one example, the present disclosure may use Elasticsearch as the main search index. Documents may be provided in different formats, such as text, Portable Document Format (PDF)™, Microsoft Word™ format, etc. In one example, the present disclosure may use Apache™ Tika and custom per-source Python™ data manipulation modules to transform the documents into a standard Java Script Object Notation (JSON) format and ingest the documents into the Elasticsearch index via its Bulk application programming interface (API). In one example, search queries can be entered to Elasticsearch either via a Flask web server or via Kibana. The Flask web server may process the resulting list of documents into a list of individuals (e.g., experts, or potential experts), and partition the list of individuals into pages. In one example, the Flask web server may also compute token frequencies for creating word clouds, as described in greater detail below. In one example, JavaScript™ modules may receive the results, generate word cloud images, and display the list of individuals (e.g., those who may be considered "experts").

In one example, data ingestion may be conducted in bulk, e.g., from large JSON files. Alternatively, or in addition, data ingestion may be from data streams, e.g., using Logstash™ or similar tools. However, in one example, the present disclosure may also utilize one or more data sources containing communications conducted by email. For example, notifications regarding technical talks may be sent within the organization by email. Notifications regarding technical documents may also be sent by email. Accordingly, to facilitate ingestion of such information, the system can process email messages. By assigning an email address to the system and including a mail server in the system, relevant email notifications that contain information or documents regarding potential experts can be sent by email to the system, processed, and automatically added to the search index. The result is a search index that contains documents and identifiers of individuals associated with the documents (e.g., authors, editors, inventors, or the like).

While in an ordinary search the goal is to find relevant documents from the search index, in the case of an expert search, the desired result is the identified experts. As such, a simple retrieval of documents is insufficient. In accordance with the present disclosure, for a given query/search, the system may perform the following steps. First, the system may use the search index to retrieve all the documents that are relevant for the search terms. For instance, in an illustrative example, in the case of conjunction ("and"), all the search terms must appear in a relevant document. In the case of disjunction ("or"), at least one of the search terms must appear in a relevant document. Second, from each document found to be relevant at the prior step, the system may extract a list of associated individuals (e.g., authors, inventors, etc.). The system may also create pairs of (individual identifier (id)/document identifier (id)) and group the pairs per individual id. Third, for each individual, the system may count the number of documents in the group of documents associated with that individual. The count can be weighted, e.g., an answer in an internal organization Q&A database may have a weight proportional to the up-votes that it receives, a scientific paper may receive a greater weight than an answer in a Q&A database, etc.

Next, the identified individuals may be sorted according to the counts, and the top-k individuals may be presented in the first page of the search result (e.g., k may be 5, 10, etc., and in one example may be selected by the searcher). In one example, for each individual presented in a current page, frequent terms associated with the individual may be extracted from the documents identified as being associated with the individual in step two. In addition, after stemming and removal of stop words, for instance, the system may generate a word cloud computed from each set of frequent terms per individual in the processed page. It should be noted that the set of frequent terms may include frequent n-grams, for small values of n (e.g., 2 and 3, for instance). The bi-grams "query language" and "communication network" are examples of such terms. In one example, the sorted list of individuals (e.g., who may thus be considered as experts, or potential experts) in the result may be paginated and presented along with the word clouds, identification, and contact information (e.g., name, department, supervisor, phone number, email address, etc.).

In addition, when scientific papers (or patent documents) are used for discovering experts, as an alternative or in addition to the foregoing, the system may compute h-indexes, g-indexes, or similar metrics of the individuals and may rank the individuals according to the h-indexes, g-indexes, or the like. In particular, the h-index of an individual is the largest number h such that there are h papers/patents of that individual that are cited at least h times each. Similarly, a g-index is the largest number such that the top g articles received (together) at least $g^2$ citations. The computation of the h-index, g-index, or the like per individual can be general—over all the documents available to the system. However, in accordance with the present disclosure the computation of the h-index, g-index, or the like (broadly, an influence index) may be only over the documents that are retrieved in the first step of the search (e.g., documents that contain the search terms), referred to herein as a topical influence index (e.g., a topical h-index). In this regard, it should be noted that the general influence index/score of an individual could be affected by documents that are irrelevant to the search topic. Thus, in one example, the present disclosure computes the influence index only with the relevant documents (in other words, a topical influence index, such as a topical h-index).

To illustrate, a set of documents D can contain scientific articles or patents, where the documents may cite one another. For a given set K of keywords, the set R contains all the relevant documents with respect to the keywords K. For example, if K is the keyword query "deep neural network" then R is the subset of D that contains the documents about "deep neural network." The decision whether a document is relevant to a given query can be done by testing if the document contains the search terms or by using any standard information retrieval (IR) technique, like vector space model (e.g., term frequency-inverse document frequency (TF-IDF)), language models, probability relevance models (e.g., Okapi BM25), Latent Dirichlet allocation, etc.

Without taking influence into account, given the repository D, the system may find all the relevant documents R, find for each author A the list of relevant documents authored by A (or the list of relevant patents or patent applications of A) that is, the documents of R in which A is an author, inventor, etc. Then, the authors may be sorted based on the number of relevant documents associated with each author. Note, however, that this does not take influence into account. An author with 20 relevant documents but with no citations should be considered less influential than an author with 10 relevant articles that received at least 10 citations each. Accordingly, in one example, the present disclosure may use a ranking based on influence indexes when searching for influential experts.

Consider that a researcher Alice has an h-index of 50 while having only 2 papers on "deep neural networks," while Bob has an h-index of 20, but 10 papers on "deep neural networks," where each one of these papers was cited more than 10 times. In that case, the h-index does not reflect the expertise of Alice and Bob on the given topic, and may not be a suitable measure for comparing between them and ranking their impacts in the area. In contrast, the present disclosure provides for a topical h-index that addresses the influence of documents associated with an individual with respect to a given topic (e.g., indicated by one or more search terms). To illustrate, there may be a set of documents (D) and a set of "relevant" documents (R) related to the search term(s). For each document d there may be two citation counts, D-citations and R-citations, where D-citations(d) is the number of citations of d by documents in D, and where R-citations(d) is the number of citations of d by documents in R. The impact score (topical h-index) can be computed based on documents in R or in D and by using either D-citations or R-citations, as presented in the following table:

TABLE 1

|  | D-citations | R-citations |
| --- | --- | --- |
| Based on D (all documents) | h-index | Topical-impact h-index |
| Based on R (relevant documents) | Global-impact topical h-index | Strictly topical h-index |

When computing a conventional h-index, the computation per author is over all the documents of the author and all the citations of these documents. That is, it is the maximal h value defined as follows:

$$\max(\{h | \text{there are } h \text{ documents } d \in \text{where } D\text{-citation} (d) \geq h\}).$$ Equation 1

When computing a global-impact topical h-index, the computation is over the relevant documents of the author (documents in R that are associated with the individual), but the citation count is based on all the documents in D. For example, given a search query "blockchain," the computation is over documents that are relevant for "blockchain," but for each document, the search considers all the citations, including citations from papers that are not related to "blockchain," e.g., per the following:

$$\max\{h | \text{there are } h \text{ documents } d \in R \text{ where } D\text{-citation} (d) \geq h\}.$$ Equation 2

This index may be used for measuring the global impact of the experts. For example, searching for experts on "graph theory" will provide experts whose impact was not necessarily limited to "graph theory." The total impact of the relevant papers of each expert is considered when ranking experts.

When computing a topical-impact h-index, the computation is based on all the documents in D, but the citation count per document is only of citations in documents that are relevant to the search. For example, in a computation of the score for a search query "blockchain," the score will count at least h documents in D which were cited at least h times by documents that are relevant to the query. This counts all the documents of the authors, but examines the impact on the field by only considering citations by documents in the area specified by the search query, e.g., per the following:

$$\max\{h | \text{there are } h \text{ documents } d \in D \text{ where } R\text{-citation} (d) \geq h\}.$$ Equation 3

For example, when trying to find people who have impacted the area of cryptography, there could be mathematicians who influenced the field, although they have no expertise in this area.

A strictly-topical h-index applies the computation just over the list of relevant documents. Only relevant documents are considered in the count and only citations from relevant documents are counted, e.g., per the following:

$$\max\{h | \text{there are } h \text{ documents } d \in R \text{ where } R\text{-citation} (d) \geq h\}.$$ Equation 4

This reflects the impact on the area in the strictest form and may be used to find experts on a topic and having a large impact on the topic.

In one example, the computation of D-citation may be performed offline as a pre-processing step because it does not depend on the search query. It can be done by indexing all the documents and managing a citation count per each document. Then, the documents may be processed iteratively. For instance, the system may consider each document d in D and may identify documents d* cited by d. For each document d* cited by d, the processing system may increase the count of d* by 1. Accordingly, a standard h-index can be computed as a score per author in an offline fashion because it is not affected by the query. However, the topical h-index depends on the query and is therefore computed in real time, when the query is provided.

For a given search query K, the computation of a global-impact topical h-index can be performed efficiently under the assumption that the D-citation function is already computed offline, as follows. The system may retrieve the set R of relevant documents using a search index (e.g., by using an Elasticsearch index, or the like). For each author A of a document in R, the documents of author A in set R may be sorted based on the precomputed D-citation count, from the most cited article to the least cited one. The computation of h (or the "h-index") is completed by iterating over the sorted list until reaching the document in the list whose index is i and its citation count is lower than i, (then h=i−1), or when reaching the last document in the list, and h is the number of documents in the list.

Computation of the index score based on the R-citation is more complex and more expensive. However, it can be performed by executing the following. Given the keywords K, the system may use the index to retrieve the set R of relevant documents. For each document in R (or in D), the system may count how many times the document is cited by documents in R (in a single pass over R). That is, compute the R-citation for all the documents (in R or in D, according to the type of index). The system may then compute the score per each author in the same way that has been described for the global-impact topical h-index while using the R-citation instead of the D-citation. Note, however, that this is an expensive computation that involves computing the R-score in real time. However, in one example, the present disclosure may store in a cache precomputed R-citation metrics for frequent queries (e.g., a small number of queries).

An alternative computation may be performed using an adapted inverted index. For instance, in a usual inverted index it is documents that are being indexed. For each given keyword or a set of keywords, the index helps quickly find the documents that are relevant for the search. For instance, for each token or phrase, the index maintains the list of relevant documents (typically sorted based on document id). The inverted index retrieves the set R of relevant documents, but with additional preprocessing. However, in one example, instead of indexing the set D={d1, d2, . . . } of all the documents, the present disclosure may index the set of all citations, that is, the set C={(di, dj, A)|di,dj∈D & A is an author of di & di cites dj}. Each tuple in the set C comprises (1) a pair of documents di, dj such that di cites dj, and (2) an author A of dj. For a given entry in the inverted index, a citation may be considered "relevant" if di is relevant (for computing topical-impact h-index) or if both di and dj are relevant (for computing strictly topical h-index). The index can be used for retrieving all the relevant citations directly. Note that for each document there is typically a bounded number of citations and authors, so the citations index is bigger than the document index by a constant multiplication factor.

To illustrate, for a given search query, the relevant citations may be retrieved using the index. Note that each citation appears per each author, and the author is part of the returned tuple. In one example, the retrieved citations may then be grouped by the author. Next, for each author, each group of citations per author is grouped by the cited documents to compute the citation count per each document. In addition, the result list of counts per document may be sorted and used for computing the topical h-index for that author. Lastly, the authors may be sorted based on their topical h-indexes, or scores. The sorted list of authors may be returned as the result of the search. It should be noted that with the list of all documents per author and citations per document, different scoring functions may be computed based on citations, e.g., a g-index instead of h-index, a topical g-index, and so forth (e.g., based on the set R of relevant documents/all of D, and using R-count/D-count, when counting citations, etc.).

In one example, the present disclosure may also provide for a generalized topical h-index in which there may be two topics, each one described as a set of keywords. That is, the input may comprise the keyword sets K1, K2. Accordingly, there are two sets of relevant documents. For instance, the sets R1 and R2 may comprise the documents relevant for keywords K1 and K2, in correspondence. The generalized topical h-index may assign a score to each author, e.g., according to the following:

$$\max\{h | \text{there are } h \text{ documents } d \in R1 \text{ where } R2\text{-citation}(d) \geq h\}. \quad \text{Equation 5}$$

The citation count R2-citation is defined as before, that is, R2-citation(d) is the number of documents in R2 that contain a reference to d. The following are examples of the generalized topical h-index. The query "find influential experts on privacy whose work had an impact on the area of operating systems" could return privacy experts who influences the area of operating systems without necessarily being experts on operating systems. Similarly, if an organization would like to explore the effect of virtual worlds and the metaverse on communication networks, a searcher could look for experts in the area of "computer graphics" whose work influenced the area of "computer networks."

In one example, the present disclosure may compute generalized scores based on an inverted index of citations, as similar to the above. For instance, using the inverted index of citations, two lists may be retrieved for K1 and K2: list L1 of citations (di, dj, A) where di∈R1, and list L2 of citation (di, dj, A) where dj∈R2. The intersection of these lists L1∩L2 provides the citations for computing the generalized topical h-index for K1 and K2. As explained above, this may be accomplished by grouping the citations per author and then by cited document, sorting the documents based on their citation counts and performing the h-index computation by iterating over the sorted list. This approach can be further generalized by looking at citations of papers of author A and the references in papers of author A, which provides information about areas that A influenced and areas that influenced A. For instance, individuals may be identified who are experts in area R1, influenced area R2, and were influenced by area R3. This is a generalization of the previous cases by selecting R1, R2, R3, or any combination of them to be the set D of all the documents. It should be noted that although the foregoing may refer primarily to finding expert "authors," the same principles apply equally to identifying others who may be associated with various documents from one or more document databases, such as document editors, inventors, patentees, and/or patent applicants, and so forth.

In one example, the result of a search may be a list of individuals (e.g., "experts" or potential experts) with information regarding their expertise and their contact details. In one example, the information regarding expertise may be presented as a word cloud created for each individual from the terms in the relevant documents. The size of each term in the word cloud may be proportional to the number of appearances (frequency) of the term in the documents associated with the discovered individual. An example of presenting a search result with representative word clouds is illustrated in in FIG. 2 and described in greater detail below. The frequent terms may alternatively or additionally be presented as a frequency list.

The result of an expert search can alternatively or additionally be presented as part of an organizational chart, where the identified individuals/experts may appear in the context of the managerial hierarchy of the organization. For example, in a search for "machine learning," the result of the search may be presented as a chart that contains an organization hierarchy (e.g., a tree format, or the like), with indicators for the top scoring individuals for "machine learning" overlaid on the chart in the respective positions within the hierarchy. An example of presenting a search result in the context of an organization hierarchy is illustrated in in FIG. 2 and described in greater detail below.

The result of an expert search may contain people that are not immediate contacts or collaborators of the searcher. When a searcher needs to approach someone not personally known, it is more effective to make the connection through an intermediary that introduces them to each other. That is, an intermediary can introduce the searcher to an expert and initiate the first contact. In a social-based expert search, connections between individuals may be used to support an egocentric search where the returned individuals (or "experts") are either people who are directly connected to the searcher (one-step associations, e.g., friends, colleagues, collaborators, co-authors, co-inventors, etc.) or are separated from the searcher by one step, that is, friend-of-a-friend (FoF), co-author of a co-author (co-co-author), etc. (e.g., "two-step associations").

There are different types of connections between individuals in a company. In one example, the following three types of connections may be used in a corporate egocentric expert search. First, people who are in the same unit are considered as colleagues. This type of connection may be identified via an organizational chart or other data structure from which an assignment to or other associations with a same unit in the organization may be indicated. In one example, the strength of a connection between two colleagues may be proportional to how long the two colleagues are in the same unit and/or to the size of the unit, e.g., two employees that are in a department of 10 people would have a stronger connection than two employees in a unit of 200 people. A second type of connection is collaborators. For instance, collaborators may be identified based on documents like technical papers, issued patents, internal Q&A database(s), etc. In particular, co-authors of a scientific paper, co-inventors, etc. may be identified as collaborators. The strength of the connection may be proportional to the number of collaboration instances (e.g., a number of shared papers). Similarly, collaborations that were made a long time ago may be ignored or given a lower weight if the collaboration has not continued (e.g., the connection between two people who co-authored three papers twenty years ago is expected to be weaker than the connection between two employees who co-authored three papers in the last two years). In one example, these types of collaborations may be identified from the same document database(s) used for the expert search in accordance with the input search terms. However, in another example, collaborations may be identified from additional document databases that are not used in the main expert search and/or different document database(s).

Still another type of connection may comprise collaborations based on meetings. For example, an organizational calendar can provide information about meetings and the participants. Two employees who often participate in the same meetings may be considered as collaborators. For instance, this may be quantified as a strength of connection that is proportional to the frequency of the meetings and inversely proportional to the number of participants in each meeting (e.g., participating in a one-on-one meeting is considered a stronger connection than participating in a meeting of 20 people). These connections can be extracted in a privacy-preserving manner by only storing in the system aggregated counts for each pair of individuals within the organization, e.g., on a per-month basis, without revealing details of the meetings, such as meeting title, time, location, and the participants.

In one example, the present disclosure may aggregate connections between individuals within the organization to yield a graph G, where the individuals are represented by nodes of G and the connections between individuals are represented by the edges between nodes. The neighbors of a node n are all the nodes connected to n by an edge. The 2-neighbors of n are all the nodes that are reachable from n by a path of length 2 in G, that is, via two edges.

In an egocentric search over the graph G of connections between individuals of the organization, the present disclosure may seek to find the individuals (e.g., experts or potential experts) that are neighbors or 2-neighbors of the searcher. In one example, for 2-neighbors, the search may identify an intermediary—an individual that is connected to both the searcher and the expert. There are, however, cases where several intermediaries connect a searcher and an expert. In this case, it is possible to select the intermediary (or the top-k intermediaries) with the (1) strongest connection to the searcher, (2) strongest connection to the expert, or (3) largest arithmetic, geometric or harmonic mean of the connections to the searcher and the expert.

In one example, the computation of search queries may rely upon the commutativity of connections. For instance, if Alice is connected to Bob, then Bob is connected to Alice. If Carol is a 2-neighbor of Alice, where Bob is the intermediary, then Alice is a 2-neighbor of Carol with Bob as an intermediary. The following describes three examples of ways to index the documents for an egocentric expert search, and accordingly, three different ways to compute queries. In all three options, each document may have a list $L_D$ of authors (or other individuals, such as editors) associated with the document. A search query may comprise a set K of keywords and a set $L_Q$ related to the searcher s. The difference between the options is in the population of the sets $L_D$ and $L_Q$.

In a first example, for small documents and a large query, the set $L_D$ of each document may contain only the authors of that document. The set $L_Q$ may comprise all of the neighbors and 2-neighbors of s in the graph G. In a second example, for medium-size documents and a medium-size query, the set $L_D$ of each document may contain the authors of the document and the neighbors of these authors. The set $L_Q$ may comprise s and all the neighbors of s. In a third example, for large documents and a small query, the set $L_D$ of each document may comprise the authors of the document, the neighbors, and the 2-neighbors of these authors. However, the set $L_Q$ may contain only s. In the second and third options, the set $L_D$ for a document can be large. For example, if a person has 200 connections and each one of them adds 100 unique 2-neighbors to the list, there would be 20,000 people added for each document. This could make the index too large and reduce the efficiency of the search.

To address this problem, in one example, the present disclosure may adapt Bloom filters into search terms. To illustrate, assume that there are k hash functions that assign each author id to a number in the range 1, . . . , m. Up to m words may be added to a document that represent the assigned bits of the Bloom filter. That is, for each id $s_j$ of a neighbor or 2-neighbors of an author of the document, there may be k numbers: $b_1=h_1(s_j), \ldots, b_k=h_k(s_j)$, which may be translated into k unique words xyz-$b_1$, . . . , xyz-$b_k$. In other words, all the words that correspond to the selected bits of the Bloom filter are added to the document—if bit j is set to 1, then the word xyz-$b_j$ is added to the list. The query may comprise the result of applying the k hash functions to the id of the searcher and applying disjunction over the result in the search. For example, for searcher s, the following are the bits that should be tested in the Bloom filter: $c_1=h_1(s), \ldots, c_k=h_k(s)$. These may be translated into a set of k words xyz-$c_1$, . . . , xyz-$c_k$. In the search, the system may retrieve only the documents that contain the k keywords, which is equivalent to testing that the relevant bits of the Bloom filter are set to 1.

In one example, the results of the ego-centric search may also be filtered such that experts with a topical h-index higher than that of the searcher will be returned (e.g., and others omitted from the results). Thus, the search result may only include individuals evaluated to have higher expertise on the search terms than the searcher. In one example, ego-centric search results may also be filtered out to include only individuals having an assigned work location (e.g., assigned office) that is the same as or close to that of the searcher, which may help to facilitate more effective collaboration.

Thus, the present examples describe an expert finder system for identifying individuals in an organization who may be experts on a particular topic. In particular, examples of the present disclosure may use a variety of data sources in a modular way, while also protecting privacy and confidentiality, and complying with organization polices. The present examples may also utilize different types of connections between individuals in the organization for conducting an egocentric, social-based search. In addition, the present examples may additionally offer a visual presentation of a synopsis per each expert (e.g., as a word cloud and/or term-frequency list), and may further present a visualization of the identified individuals (e.g., experts) in the context of the organizational hierarchy.

In one example, the present disclosure may collect and store the history of searches, e.g., for statistical purposes and to improve the system. However, search terms that are posed by a searcher could reveal sensitive information about the searcher. For example, seeing that a manager, searches for experts on "self-driving cars" might reveal new endeavors of the manager, which the manager may prefer not to disclose. Accordingly, in one example, the present disclosure does not collect and store information about searches at a personal level. For instance, in one example, the present disclosure may collect information per large organizational units, e.g., departments with more than 50 individuals. In such case, stored search terms will not be associated with any individual. In one example, searchers may be enabled to specify that some searches are sensitive and should be associated with larger company units or should not be stored at all. However, in one example, aggregation of searches may still not provide a desired level of privacy. For instance, if there is insufficient diversity in the search terms, information could be leaked. Other attributes of the search, such as the time when the search query was posed or the location from which queries were posed, might also reveal information that could be used to identify the searcher. To illustrate, if in a large organization only a few individuals are located in Seattle, a search associated with Seattle might reveal the identity of the searcher, even when the searches are associated with the entire organization. Terminology and spelling might also reveal information about searchers. To mitigate these potential privacy leaks, information should only be revealed if there is sufficient diversity in the search queries and the other attributes, as elaborated next.

In accordance with the present disclosure, it may be assumed that information on each search $S_j$ is stored as a record $S_j=(A_{1j}, \ldots, A_{nj}, Q_j)$, where $A_{1j}, \ldots, A_{nj}$ are attributes, e.g., the department of the searcher, search location, search time, etc. The search query $Q_j$ may include the search terms, e.g., the query string, and other search parameters. Information release is a dataset of searches $D=\{S_1, \ldots, S_m\}$. A selection from D is identified by matching the attributes to n given values $v_1, \ldots, v_n$, that is, selecting all the searches $S_j$ such that $A_{1j}=v_1, \ldots, A_{nj}=v_n$. It may be considered that the dataset D supports k-anonymity (l-diversity) if every selection of searches from D providing n values either does not return any result or returns searchers associated with at least k different searchers (with at least l different query strings). In other words, the foregoing describe k-anonymity and l-diversity privacy-preserving methods specifically adapted to expert search. The values k and l may be selected based on the privacy policy of the organization. When k and l are small, sensitive information could be inferred. However, when they are too large, the requirement could prevent releasing information altogether.

In one example, when the dataset of searches does not provide k-anonymity or l-diversity, the following two approaches may be applied. First, the present disclosure may generalize the search attributes, e.g., replace the department, unit, etc. in the search attributes by a larger unit, division, etc. that contains the original department, unit, etc. according to the search attributes. Similarly, time and location can be generalized by replacing an hour by a day, a city by a state, etc. Second, information on searches that may cause a privacy breach could remain concealed, until the required privacy requirements are met.

Alternatively, or in addition, in one example, to provide discretion for experts, searches that are associated with less than k experts may be concealed when providing statistics about searches or when releasing information about past searches. For instance, a privacy breach may occur where someone can see that an expert appeared in a search result with less than k other experts but has not been approached. This can be implemented in a similar way to protect the privacy of searchers.

In addition, it should be noted that a social network can be used for enhancing or supporting a search, e.g., a person who is associated with many "machine learning" experts could be a good authority for expertise in the area of "machine learning," either as an expert in this area or as an intermediary who could help reaching out to experts in the area. However, connections between people in the social network may be considered sensitive information. Thus, in one example, revealing connections may be permitted when it is allowed and necessary for the search. Moreover, the search could be limited by the social network. For instance, a searcher might conduct the search only over friends or people who are friend-of-a-friend in the social network. In one example, connections between individuals may be labeled as private connections. In such case, the system may also avoid using edges in the social network if these edges are private links.

Another concern in social search is that experts may refuse to collaborate or not be able to help, due to lack of time, lack of knowledge, or other reasons. To address this issue, the system may first automatically send an email, text message, or similar communication to an individual identified in a search and ask for the individual's approval to appear in the search result. This may also include some added explanations about the searcher's need or a project associated with the search. The communication may contain an approval link and a disapproval link, and a clicked link may indicate whether the individual is open to consideration for collaborating. After gathering the responses from one or more individuals (e.g., experts or potential experts), an email, text, or similar communication may be sent to the searcher. For instance, after 24 hours, 48 hours, etc. the system may notify the searcher that results are ready for viewing. In one example, this process may also be executed with the help of intermediaries. For instance, initially only the intermediaries may be informed (e.g., via automatic email, text, or the like) of respective individuals identified in the search (e.g., the "experts"). The intermediaries may then be tasked with approaching the experts, and indicating to the system those expert(s) consenting to further consideration. As such, only names of individuals who agree to help may be provided to the searcher. This may prevent cases where overloaded experts may become unpopular due to too many refusals.

The result of a search is a list of individuals, e.g., employees, members, or others associated with an organization. To elucidate the results, a synopsis may be presented for each individual in the list to explain or illustrate why the person appears in the search result. The synopsis can include links to resources, such as papers written by the individual, documents that describe projects of the individual, relevant publicly available code repositories (or private code repositories that may be open within the organization), etc. However, some information sources could be private or restricted, and should not be presented to the searcher. In such cases, the synopsis of an individual/potential expert may therefore be presented so as to not reveal any confidential information. For instance, in accordance with the present disclosure, a synopsis may be presented as a word cloud. For example, the words in the relevant documents of the individual may be collected, counted, and used for creating the word cloud. In one example, the present disclosure may base the size of the term in the word cloud on the frequency of each term in the documents associated with the expert. Alternatively, or in addition, the present disclosure may present a synopsis as a term list, where the most frequent terms in the relevant documents are presented, sorted by frequency.

Similarly, search terms and search results may reveal information about goals and plans of the organization. For example, if a company hires many experts in a particular field, it might reveal plans for expansion in that field. To protect business confidentiality, the system can apply one or more access control approaches for restricting access to people and/or restricting access to topics. For instance, individuals may have expertise that may be labeled in the system as confidential. These individuals may only appear in the result of searches by searchers with proper access permission (e.g., according to the principle of least privilege). For example, each potential expert may be assigned a confidentiality label in the range 1-5, and each searcher may be assigned a set of roles from a given set R of roles. An access policy P={(r,l)|r∈R, l∈[1,5]} is a set that specifies, for each role r in R, which individuals can be revealed to the searcher based on the roles of the searcher. If a searcher has roles $r_1$, $r_2$ then an individual with confidentiality level 4 would appear in the result only if access to individuals with confidentiality level 4 is permitted to one of these roles according to policy P, e.g., $(r_1, 4) \in P$ or $(r_2, 4) \in P$. It should be noted that there may be various types of roles and many different types of confidentiality levels. As such, the policy may be applied in a dynamic way where searcher roles may change over time. The policy and the assignment of roles to confidentiality levels may also change according to the organization's preferences, new roles and new confidentiality levels may be defined and applied, new restrictions may be defined for some individuals or departments, and so on.

Alternatively, or in addition, other access control methods may be applied in a similar manner. For example, in discretionary access control (DAC), the searcher may determine who should have access to his/her searches. In mandatory access control (MAC), access to information may be based on clearance of the user. In attribute based access control (ABAC), policies and rules defined over attributes of the data, the searcher, and the access attempt (e.g., when and where) may be used for deciding whether the access should be granted. These and other aspects of the present disclosure are described in greater detail below in connection with the examples of FIGS. 1-4.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining an expert search system (e.g., a processing system), personnel engaging in expert search within the organization for various purposes, and so forth.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for presenting an ordered list of individuals in accordance with scores based upon a number of citations of a second plurality of documents from at least one document database to documents associated with the individuals from among a first plurality of documents from the at least one document database that are associated with at least one search term, as described herein. For example, one of the server(s) 135, or a plurality of servers 135 collectively, may perform operations in connection with the example method 300 of FIG. 3, or as otherwise described herein. Similarly, one or more of the server(s) 135 may represent an expert search system. In other words, one or more of the server(s) 135 may provide an expert search service.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of examples of the present disclosure for presenting an ordered list of individuals in accordance with scores based upon a number of citations of a second plurality of documents from at least one document database to documents associated with the individuals from among a first plurality of documents from the at least one document database that are associated with at least one search term. As just one example, DB(s) 136 may be configured to receive and store documents in one or more document databases (e.g., a database of scientific and/or technical papers, a database of patent documents of individuals associated with an organization (e.g., an operator of telecommunication service provider network 150), or the like), and so forth. In addition, DB(s) 136 may store metadata regarding documents in one or more document databases, such as, for each document: other documents that cite to the document, other documents that are cited by the document, individuals associated with the document (e.g., authors, editors, patentees and/or applicants (for patent documents), or the like), and/or other bibliographic data. In one example, documents for various document databases may be compiled and processed, e.g., normalized, transformed, tagged, etc., and forwarded to DB(s) 136, such as via one or more of the servers 155. For instance, one or more of the documents databases may comprise a public document repository.

In one example, DB(s) 136 may be configured to receive and store organizational hierarchy data. For instance, DB(s)

136 may store personnel records of a telecommunication network service provider (e.g., an operator of telecommunication service provider network 150) or other entities associated with the service network 130. The personnel records may indicate assigned offices of personnel, assigned departments, supervisor information, and so forth. Similarly, DB(s) 136 may be configured to receive and store records relating to conference attendance (e.g., in-person, or video conferences), and so forth. In one example, personnel records may also indicate various data access permission. For instance, as described above, certain individuals may not have permission to access certain other individuals in a result set when searching for an expert that is internal to the organization.

In an illustrative example, a searcher may enter one or more search terms, such as via device 131, which may be provided to server(s) 135 along with an identity of the searcher. In one example, one or more other parameters relating to the search may also be entered, such as the preferred document database(s) to use, a preference for topical impact h-index, global impact topical h-index, etc., preferred locations or geographic bounds for individuals to be returned in the search results (e.g., only identify potential experts in offices "Atlanta" and "Jacksonville"), and so forth.

Using the document database(s) and other data stored in DB(s) 136, server(s) 135 may identify a plurality of individuals who are either one-step associations of the searcher or two-step associations of the searcher (e.g., using the organization hierarchy and/or personnel profiles stored in DB(s) 136). Server(s) 135 may also identify from at least one document database a first plurality of documents associated with the plurality of individuals and also associated with the at least one search term. Server(s) 135 may then calculate, for each individual of the plurality of individuals, a score for the individual that is based upon a number of citations of a second plurality of documents from the at least one document database to documents associated with the individual from among the first plurality of documents (e.g., an h-index, or the like). In one example, server(s) 135 may also generate an invitation to at least one individual of the plurality of individuals to appear in a search result, and obtain a consent to appear in the search result from the at least one individual. In addition, server(s) 135 may present an ordered list of at least a portion of the plurality of individuals, e.g., via device 131, where the list may be ordered by the score for each individual, and where the list may include at least one individual for which consent has been obtained. Further details regarding operations of server(s) 135 for presenting an ordered list of individuals in accordance with scores based upon a number of citations of a second plurality of documents from at least one document database to documents associated with the individuals from among a first plurality of documents from the at least one document database that are associated with at least one search term, are discussed below in connection with the examples of FIGS. 2 and 3.

Figure 3:
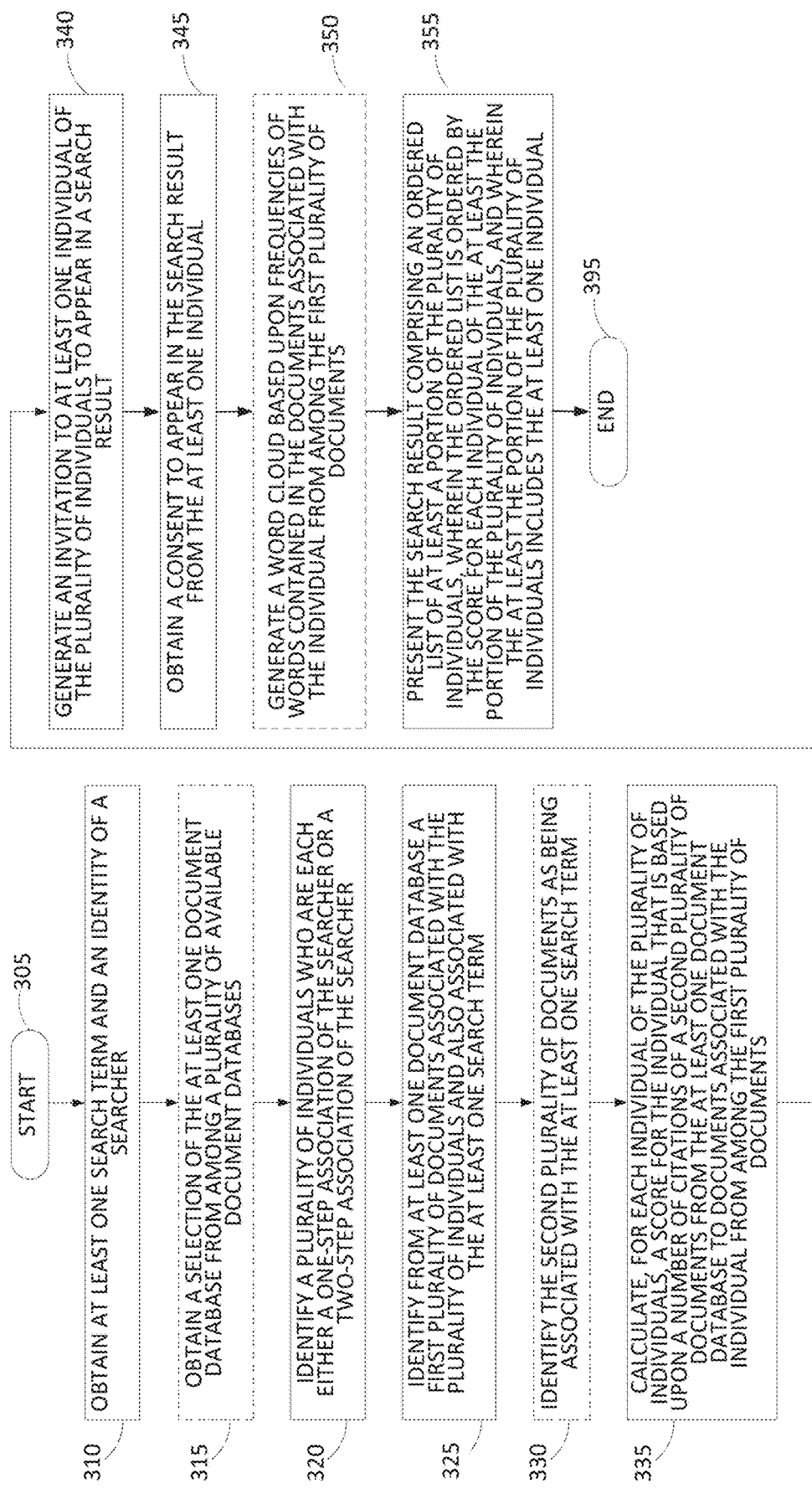
FIG. 3 illustrates a flowchart of an example method for presenting an ordered list of individuals in accordance with scores based upon a number of citations of a second plurality of documents from at least one document database to documents associated with the individuals from among a first plurality of documents from the at least one document database that are associated with at least one search term.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. As noted above, in one example, one or more of the servers 135 may comprise a processing system that is configured to perform operations for presenting an ordered list of individuals in accordance with scores based upon a number of citations of a second plurality of documents from at least one document database to documents associated with the individuals from among a first plurality of documents from the at least one document database that are associated with at least one search term, as described herein. For instance, a flowchart of an example method 300 for presenting an ordered list of individuals in accordance with scores based upon a number of citations of a second plurality of documents from at least one document database to documents associated with the individuals from among a first plurality of documents from the at least one document database that are associated with at least one search term is illustrated in FIG. 3 described in greater detail below.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. In addition, although the foregoing describes an example of an organization operating telecommunication service provider network 150, in another example, server(s) 135 and/or server(s) 135 in conjunction with DB(s) 136 may provide an expert search service to one or more third parties, e.g., to another organization as a network-based service. Thus, these and other modifications are all contemplated within the scope of the present disclosure.

Figure 2:
FIG. 2 illustrates an example search result screen with representative word clouds and an example search result screen that presents a search result in the context of an organization hierarchy.

FIG. 2 illustrates an example screen 200 visually presenting a search result with word clouds for several individuals (e.g., experts, or "potential experts), as well as an example screen 210 visually presenting a search result within a graph of an organization hierarchy. For example, a searcher may have entered the search term "database," with the result as shown in screen 200. As illustrated in FIG. 2, the example screen 200 includes a list of individuals (e.g., "experts" or potential experts), contact details, and word clouds representing each individual's expertise. For instance, as noted above, the size of each term in the word cloud may be proportional to the number of appearances (frequency) of the term in the documents associated with the individual. Although not illustrated in FIG. 2, the frequent terms may alternatively or additionally be presented as a list of the most frequent words.

Screen 210 illustrates an example in which the result of an expert search is presented as part of an organizational chart, where the identified individuals/experts may appear in the context of the managerial hierarchy of the organization. For example, the result of the search may be presented as a chart that contains an organization hierarchy (e.g., a tree format, or the like), with indicators for the top scoring individuals for the search indicated on the chart in the respective positions within the hierarchy. For instance, Alice and Bob are highlighted at their respective positions in the organization hierarchy. In the present example, the searcher (i.e., "you" (e.g., a user)) is also indicated as an individual in the hierarchy. In addition, as noted above, it may be helpful to a searcher to have others within the organization who are contacts/connections of the searcher and who are also contacts/connections with one or more individuals who are identified as experts/potential experts in the search results. For example, Alice and Bob may be identified as potential experts in the search results. Mike may be known to the searcher and may also be known to Bob. Thus, Mike may be identified as a possible facilitator for the searcher to collaborate with Bob, as indicated by the dotted lines connecting the searcher to Bob through Mike. Similarly, Lucy may be known to the searcher and may also be known to Alice. Thus, Lucy may be identified as a possible facilitator for the searcher to collaborate with Alice, as indicated by the dotted lines connecting the searcher to Alice through Lucy.

It should be noted that FIG. 2 illustrates representative examples of search result screens in accordance with the present disclosure, and that in other, further, and different examples, the results may be presented in various other formats. For instance, instead of word clouds, a list of words and/or terms may be displayed for each identified individual on an initial screen or in a subsequent screen that may be presented in response to selecting a particular individual (such as by clicking on a region of the screen 200 via a user interface, speaking a voice command, or the like). In one example, the present disclosure may also search for and include former employees in the search result (or other individuals who have been associated with the organization in the past and who may have records maintained in a personnel profile database, or the like). In one example, the ability to include "legacy individuals" may be an option that may be selected by the searcher. Similarly, it should be noted that a searcher may select different options from the screen 200 and/or screen 210 which may lead to additional screens, or pages. For instance, in one example, clicking on "Alice" on either of screens 200 or 210 may lead to supporting documents that were used in the search, that is, public and/or non-confidential documents associated with Alice that are relevant to the search query. Thus, these and other modifications, and/or additional features, are contemplated within the scope of the present disclosure.

FIG. 3 illustrates a flowchart of an example method 300 for presenting an ordered list of individuals in accordance with scores based upon a number of citations of a second plurality of documents from at least one document database to documents associated with the individuals from among a first plurality of documents from the at least one document database that are associated with at least one search term, according to the present disclosure. In one example, the method 300 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system. The method 300 begins in step 305 and may proceed to step 310.

At step 310, the processing system obtains at least one search term and an identity of a searcher, e.g., a query/search for experts relating to the search term(s). The searcher may be associated with an organization and may have one or more records associated with the searcher that is/are stored by the processing system and/or accessible to the processing system. The at least one search term may comprise one or more words, one or more phrases or other terms, Boolean search operators, such as conjunctions (e.g., "and", "or", etc.), disjunctions (e.g., "not"), etc., wildcards, or other search operators. Alternatively, or in addition, the at least one search term may be a "natural language" search query that may be parsed and decomposed into various Boolean operations, or the like.

At optional step 315, the processing system may obtain a selection of the at least one document database from among a plurality of available document databases. For instance, the searcher may select which document database(s) to use in support of the expert search. Alternatively, or in addition, an operator of the processing system (e.g., an expert search service/processing system) may provide one or more parameters, or settings, defining the available document database(s), which database(s) should be active, and so forth. In one example, the at least one document database may comprise an internal database of an organization of the searcher (e.g., a repository of technical documents on various subjects authored by individuals associated with the entity).

At step 320, the processing system identifies a plurality of individuals who are each either a one-step association of the searcher or a two-step association of the searcher. For example, as noted above the searcher may be associated with an organization and may have one or more records associated with the searcher that is/are stored by the processing system and/or accessible to the processing system. In one example, the records may include information regarding a unit or division to which the searcher is assigned within the organization. The processing system may use similar records regarding other individuals within the organization to identify individuals within the same unit, division, etc. as the searcher. Alternatively, or in addition, the processing system may access an organization hierarchy, e.g., in a graph database or another format which indicates associations between individuals, e.g., supervisors, direct reports, individuals within a same unit or reporting to the same supervisor, etc. In one example, the processing system may maintain for each individual, a list of other contacts within the organization, e.g., those with whom the individual has had direct communications (such as may be identified via email and/or phone records), co-authors as identified in document metadata or the like, co-inventors or co-applicants as indicated by various patent documents, and so forth. In addition, for each direct connection of the searcher (e.g., one-step associations) a similar process may be followed to identify two-step associations.

Thus, for example, the one-step associations may include colleagues in an organizational unit of the searcher, co-authors of at least one document in which the searcher is an author, and/or co-inventors identified in at least one patent document in which the searcher is an inventor (alternatively or additionally, a patentee and/or applicant). In various examples, one-step associations may further include, individuals within an organization who are in a contact list of the searcher, co-participants of at least one conference committee in which the searcher is a participant, panelist, or the like. Similarly, the two-step associations may include: colleagues in an organizational unit of at least one of the one-step associations, co-authors of at least one document in which at least one of the one-step associations is an author, and/or co-inventors identified in at least one patent document in which at least one of the one-step associations is an inventor.

In various examples, two-step associations may further include: individuals within an organization who are in a contact list of at least one of the one-step associations, co-participants of at least one conference committee in which at least one of the one-step associations is a participant, panelist, or the like, those having an editor-author relationship for at least one document (or author-editor relationship for at least one document), e.g., where the at least one document may be from the at least one document database, or one or more additional document databases of a plurality of available document databases.

At step 325, the processing system identifies from at least one document database a first plurality of documents associated with the plurality of individuals and also associated with the at least one search term. For instance, each document of the first plurality of documents may be determined to be associated with at least one individual of the plurality of individuals when the at least one individual is at least one of: an author of the document, an editor of the document, or for a document comprising a patent document, an inventor indicated for the document. In addition, each document of the first plurality of documents may be determined to be associated with the at least one search term in accordance with an information retrieval metric of the document for the at least one search term. For example, the information retrieval metric may comprise a TF-IDF metric, a probability relevance model, a latent Dirichlet allocation model, or the like.

At optional step 330, the processing system may identify a second plurality of documents from the at least one document database as being associated with the at least one search term. For instance, optional step 330 may search for the second plurality of documents from within the at least one document database that are relevant to the at least one search term and which cite to one or more of the documents in the first plurality of documents identified at step 325. Thus, in one example, the second plurality of documents is also associated with the at least one search term (e.g., and excludes documents that are not associated with the at least one search term). It should be noted that although in one example the first plurality of documents and the second plurality of documents may all be associated with the at least one search term, the second plurality of documents is not restricted to those being associated with one-step or two-step associations of the searcher.

In one example, the at least one search term may comprise at least two search terms (e.g., separate search terms, or separate groups of search terms). For instance, as noted above, a searcher may wish to identify experts in the area of "computer graphics" whose work influenced the area of "computer networks." In such case, step 325 may identify and associate documents regarding "computer graphics" to respective individuals, while optional step 330 may search for the second plurality of documents from within the at least one document database that are relevant to the term "computer networks" and which cite to one or more of the documents in the first plurality of documents identified at step 325.

At step 335, the processing system calculates, e.g., for each individual of the plurality of individuals, a score for the individual that is based upon a number of citations of a second plurality of documents from the at least one document database to documents associated with the individual from among the first plurality of documents. In one example, the score may be a count of the number of citations, an h-index, a g-index, or the like. In another example, the score may be a topical influence index (e.g., a topical-impact influence index, a global-impact topical influence index, or a strict topical influence index, such as a topical h-index (e.g., a topical-impact h-index, a global-impact topical h-index, a strict topical h-index, or the like) or a similar topical metric based upon a g-index, and so forth). For instance, in the case of the strict topical h-index, the second plurality of documents identified at step 330 may also be associated with the at least one search term.

In one example, the score for the individual is based upon a composition of document scores for the documents associated with the individual from among the first plurality of documents. For instance, in one example, a document score for a document associated with the individual may comprise a weighted combination of an information retrieval metric of the document for the at least one search term and information retrieval metrics for each document from the second plurality of documents citing to the document associated with the individual (e.g., where the information retrieval metric comprises a TF-IDF metric, a probability relevance model, a latent Dirichlet allocation model, or the like. In one example, step 335 may include additional weighting for more recent documents (in terms of the document in question, as well as the citing documents). In one example, the weighting(s) may be selected by the searcher.

At step 340, the processing system generates an invitation to at least one individual of the plurality of individuals to appear in a search result. For instance, the processing system may rank the individuals by score. At step 340, the processing system may then invite one or more of the top identified individuals (e.g., potential experts) for consent to appear in the search result. The invitation may be sent via email, text message, or the like, e.g., with a link to provide consent or to login to a personnel system to provide consent, with an invitation to provide a reply text message (e.g., "yes" or "no," 1 or 2, or the like), etc.

At step 345, the processing system obtains the consent to appear in the search result from the at least one individual. For instance, the individual may provide a response via a reply text message, by selecting a link in an email, by logging-in to a personnel system to provide consent by selecting an option via a user interface for providing such consent, and so forth.

At optional step 350, the processing system may, for each individual of at least a portion of the plurality of individuals, generate a word cloud based upon frequencies of words contained in the documents associated with the individual from among the first plurality of documents. The at least the portion of the plurality of individuals may comprise the top n individuals, such as the top 5 individuals, the top 10 individuals, etc. In one example, the number n may be based upon a number of individuals that may fit on a page/screen via which search results may be presented. In another example, the number n may be proportional to the number of individuals that may fit on a page/screen. For instance, step 350 may comprise generating word clouds for individuals who may appear in the first three pages/screens of the result according to a ranking based upon the scores determined at step 335. As noted above, in one example, relative sizes of words in the word cloud may be proportional to the respective frequencies of the words in the documents associated with the individual (e.g., from within the first plurality of documents and/or from the at least one document database overall).

At step 355, the processing system presents the search result comprising an ordered list of at least a portion of the plurality of individuals. For instance, the ordered list may be ordered by the score for each individual of the at least the portion of the plurality of individuals. In addition, it should be noted that the at least the portion of the plurality of individuals may include the at least one individual (from whom consent has been obtained at step 345). In one example, the presenting of the ordered list may include presenting the word cloud for each individual of the at least the portion of the plurality of individuals.

Following step 355, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-355 for additional searchers, steps 340 and 345, or steps 340-355 for additional individuals, e.g., a second page of the results, a third page of the results, etc. and so forth. In one example, step 315 may be part of step 310. In one example, step 350 may be performed in advance (e.g., prior to step 310). For instance, in one example, the word cloud may be based upon all available documents for an individual and may be updated from time to time as new documents are entered into the at least one document database, as documents become older, and so forth. In one example, the method may further include generating a citation index, such as described above, where documents are associated with possible search terms. In still another example, steps 340 and 345 may be omitted or may be performed in advance (e.g., prior to step 310). For instance, the processing system may obtain pre-approvals of various individuals to appear in search results (and conversely, possible denials of consent for one or more individuals).

In one example, the method 300 may omit an identity of a searcher from step 310 and may omit step 320. In other words, the plurality of individuals for purposes of step 330 and subsequent steps may be all candidates of experts from among document authors, editors, inventors, etc. within the document database, and may not be limited to one-step or two-step associations of the searcher. In one example, the method 300 may include obtaining at least one search term, identifying a first plurality of documents from at least one document database associated with the at least one search term, identifying a second plurality of documents from the at least one document database that are cited by the first plurality of documents, wherein the second plurality of documents is associated with a plurality of individuals, calculating a score for each individual of the plurality of individuals that is based upon a number of documents associated with the individual from among the second plurality of documents (e.g., a topical impact influence index, such as a topical impact h-index or topical impact g-index), and presenting an ordered list of at least a portion of the plurality of individuals, wherein the ordered list is ordered by the score for each individual.

In one example, the method 300 may be modified to identify relevant documents and then identify which documents are associated with individuals who are one-step or two-step associations of the searcher. In one example, the method 300 may be expanded to include presenting search results within an organization hierarchy, such as illustrated in screen 210 of FIG. 2. Similarly, in one example, the method 300 may be expanded to include presenting search results along with term frequency list. In still another example, the method 300 may alternatively or additionally include identifying one or more intermediaries in the search results, such as described above. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
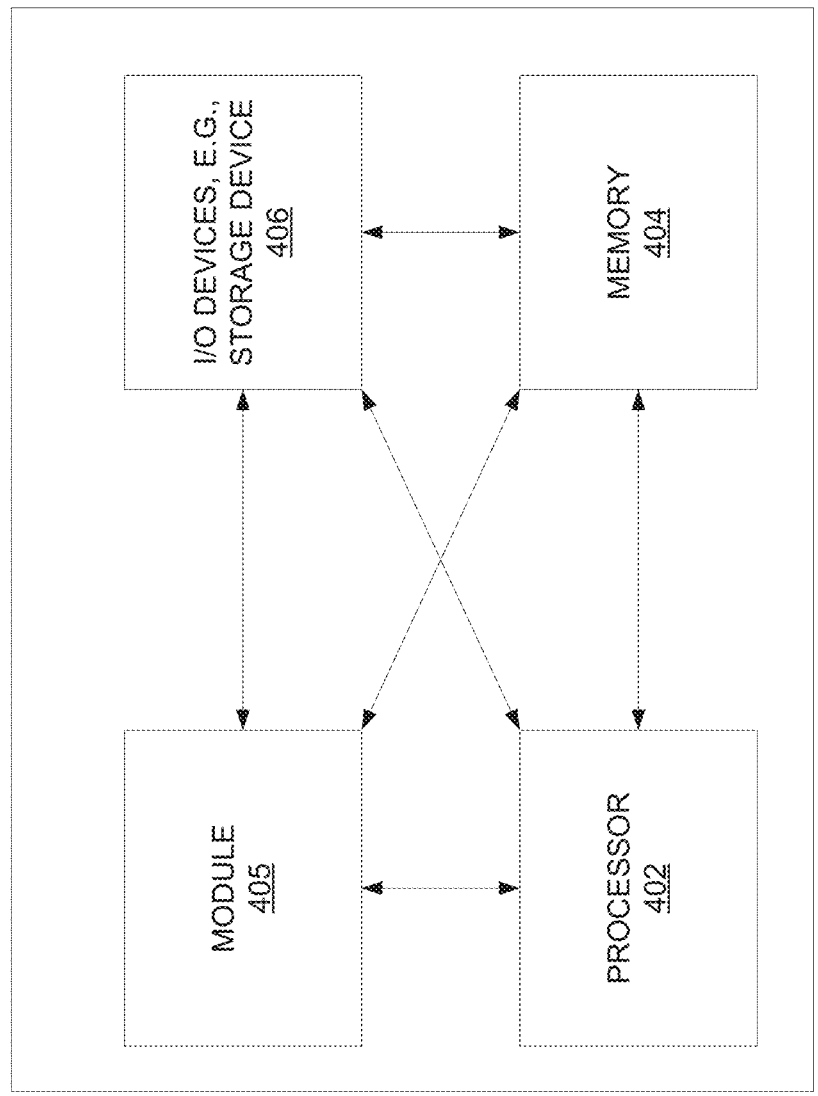
FIG. 4 illustrates a high-level block diagram of a computing device specially programmed to perform the functions described herein.

FIG. 4 depicts a high-level block diagram of a computing system 400 (e.g., a computing device or processing system) specifically programmed to perform the functions described herein. For example, any one or more components, devices, and/or systems illustrated in FIG. 1, or described in connection with FIGS. 2 and 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for presenting an ordered list of individuals in accordance with scores based upon a number of citations of a second plurality of documents from at least one document database to documents associated with the individuals from among a first plurality of documents from the at least one document database that are associated with at least one search term, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for presenting an ordered list of individuals in accordance with scores based upon a number of citations of a second plurality of documents from at least one document database to documents associated with the individuals from among a first plurality of documents from the at least one document database that are associated with at least one search term (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for presenting an ordered list of individuals in accordance with scores based upon a number of citations of a second plurality of documents from at least one document database to documents associated with the individuals from among a first plurality of documents from the at least one document database that are associated with at least one search term (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server. While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   obtaining, by a processing system including at least one processor, at least one search term and an identity of a searcher;
   identifying, by the processing system, a plurality of individuals who are associations of the searcher, wherein the plurality of individuals includes individuals who are one-step associations of the searcher and individuals who are two-step associations of the searcher;
   identifying, by the processing system, from at least one document database a first plurality of documents associated with the plurality of individuals and also associated with the at least one search term;
   calculating, by the processing system for each individual of the plurality of individuals, a score for the individual that is based upon a number of citations of a second plurality of documents from the at least one document database to documents associated with the individual from among the first plurality of documents, wherein the score for the individual comprises a topical influence index, and wherein the second plurality of documents is also associated with the at least one search term;
   generating, by the processing system, an invitation to at least one individual of the plurality of individuals to appear in a search result;
   obtaining, by the processing system, a consent to appear in the search result from the at least one individual; and
   presenting, by the processing system, the search result comprising an ordered list of at least a portion of the plurality of individuals, wherein the ordered list is ordered by the score for each individual of the at least the portion of the plurality of individuals, and wherein the at least the portion of the plurality of individuals includes the at least one individual.

2. The method of claim 1, wherein the one-step associations comprise at least one of:
   a colleague in an organizational unit of the searcher;
   a co-author of at least one document in which the searcher is an author; or
   a co-inventor identified in at least one patent document in which the searcher is an inventor.

3. The method of claim 2, wherein the two-step associations comprise at least one of:
   a colleague in an organizational unit of at least one one-step association of the searcher;
   a co-author of at least one document in which at least one one-step association of the searcher is an author; or
   a co-inventor identified in at least one patent document in which at least one one-step association of the searcher is an inventor.

4. The method of claim 1, wherein the score for each individual comprises a global impact topical influence index.

5. The method of claim 1, wherein the second plurality of documents excludes documents that are not associated with the at least one search term.

6. The method of claim 1, wherein the score for each individual comprises a strict topical influence index.

7. The method of claim 1, further comprising:
identifying the second plurality of documents as being associated with the at least one search term.

8. The method of claim 1, wherein each document of the first plurality of documents is determined to be associated with at least one individual of the plurality of individuals when the at least one individual is at least one of:
an author of the document;
an editor of the document; or
for a document comprising a patent document, an inventor indicated for the document.

9. The method of claim 1, further comprising:
obtaining a selection of the at least one document database from among a plurality of available document databases.

10. The method of claim 1, wherein the at least one document database comprises an internal database of an organization of the searcher.

11. The method of claim 1, further comprising, for each individual of the at least the portion of the plurality of individuals:
generating a word cloud based upon frequencies of words contained in the documents associated with the individual from among the first plurality of documents.

12. The method of claim 11, wherein the presenting of the search result comprises presenting the word cloud for each individual of the at least the portion of the plurality of individuals.

13. The method of claim 11, wherein relative sizes of words in the word cloud are proportional to the respective frequencies of the words.

14. The method of claim 1, wherein the score for the individual is based upon a composition of document scores for the documents associated with the individual from among the first plurality of documents.

15. The method of claim 14, wherein a document score for a document associated with the individual comprises a weighted combination of an information retrieval metric of the document for the at least one search term and information retrieval metrics for each document from the second plurality of documents citing to the document associated with the individual.

16. A non-transitory computer-readable medium storing instructions which, when executed by a processing system including at least one processor, cause the processing system to perform operations, the operations comprising:
obtaining at least one search term and an identity of a searcher;
identifying a plurality of individuals who are associations of the searcher, wherein the plurality of individuals includes individuals who are one-step associations of the searcher and individuals who are two-step associations of the searcher;
identifying from at least one document database a first plurality of documents associated with the plurality of individuals and also associated with the at least one search term;
calculating, for each individual of the plurality of individuals, a score for the individual that is based upon a number of citations of a second plurality of documents from the at least one document database to documents associated with the individual from among the first plurality of documents, wherein the score for the individual comprises a topical influence index, and wherein the second plurality of documents is also associated with the at least one search term;
generating an invitation to at least one individual of the plurality of individuals to appear in a search result;
obtaining a consent to appear in the search result from the at least one individual; and
presenting the search result comprising an ordered list of at least a portion of the plurality of individuals, wherein the ordered list is ordered by the score for each individual of the at least the portion of the plurality of individuals, and wherein the at least the portion of the plurality of individuals includes the at least one individual.

17. A device comprising:
a processing system including at least one processor; and
a computer-readable medium storing instructions which, when executed by the processing system, cause the processing system to perform operations, the operations comprising:
obtaining at least one search term and an identity of a searcher;
identifying a plurality of individuals who are associations of the searcher, wherein the plurality of individuals includes individuals who are one-step associations of the searcher and individuals who are two-step associations of the searcher;
identifying from at least one document database a first plurality of documents associated with the plurality of individuals and also associated with the at least one search term;
calculating, for each individual of the plurality of individuals, a score for the individual that is based upon a number of citations of a second plurality of documents from the at least one document database to documents associated with the individual from among the first plurality of documents, wherein the score for the individual comprises a topical influence index, and wherein the second plurality of documents is also associated with the at least one search term;
generating an invitation to at least one individual of the plurality of individuals to appear in a search result;
obtaining a consent to appear in the search result from the at least one individual; and
presenting the search result comprising an ordered list of at least a portion of the plurality of individuals, wherein the ordered list is ordered by the score for each individual of the at least the portion of the plurality of individuals, and wherein the at least the portion of the plurality of individuals includes the at least one individual.

18. The device of claim 17, wherein the one-step associations comprise at least one of:
a colleague in an organizational unit of the searcher;
a co-author of at least one document in which the searcher is an author; or
a co-inventor identified in at least one patent document in which the searcher is an inventor.

19. The device of claim 18, wherein the two-step associations comprise at least one of:
a colleague in an organizational unit of at least one one-step association of the searcher;
a co-author of at least one document in which at least one one-step association of the searcher is an author; or
a co-inventor identified in at least one patent document in which at least one one-step association of the searcher is an inventor.

20. The device of claim 18, wherein the score for each individual comprises a global impact topical influence index.

\* \* \* \* \*